United States Patent

[11] 3,578,024

[72] Inventor Jennings Paul Hill
 9861 Memphis Ave., Apt. 9A6, Cleveland, Ohio 44144
[21] Appl. No. 776,850
[22] Filed Oct. 31, 1968
[45] Patented May 11, 1971

[54] SUPPLY AND EXHAUST CONTROL VALVE
 10 Claims, 4 Drawing Figs.
[52] U.S. Cl. .................................................. 137/627.5
[51] Int. Cl. ................................................... F16k 11/10
[50] Field of Search ........................................ 137/627.5, 596, 625.2

[56] References Cited
 UNITED STATES PATENTS
 3,048,193  8/1962  Cislo .......................... 137/627.5
 3,107,694 10/1963  Hastings ..................... 137/627.5
 3,129,788  4/1964  Heckt .......................... 137/630.15X
 3,411,539 11/1968  Machado .................... 137/627.5
 3,436,017  4/1969  Elmer .......................... 137/627.5X Primary Examiner—Clarence R. Gordon
Attorney—Ashlan F. Harlan, Jr.

ABSTRACT: A fluid control valve of the supply and exhaust type including a slidable valve cartridge having a valve face normally sealing access of fluid to a work port and having an interior passage providing communication from said work port to exhaust normally sealed by a valve face on a plunger slidably movable within said cartridge, said plunger being movable against spring resistance to open said communication to exhaust or to allow fluid flow to said work port and sealing means to prevent leakage.

INVENTOR.
Jennings Paul Hill
BY
Ashlan P. Harlan Jr.
ATTORNEY.

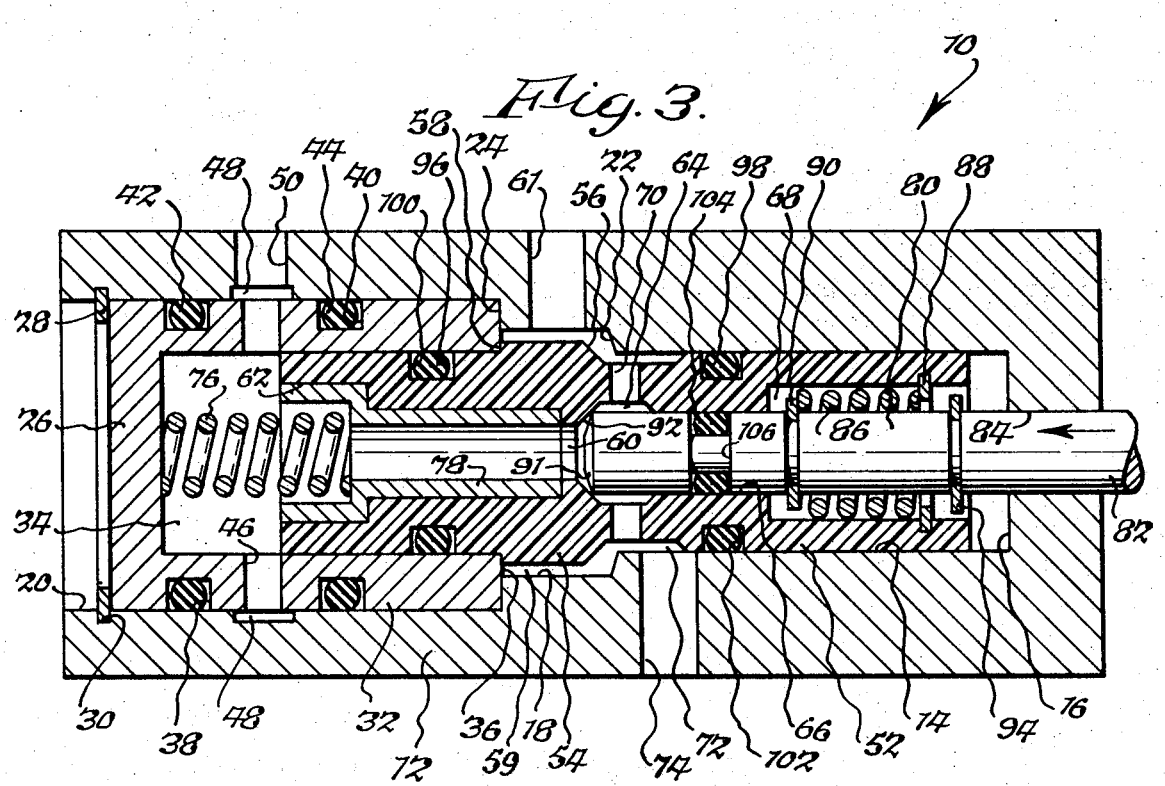
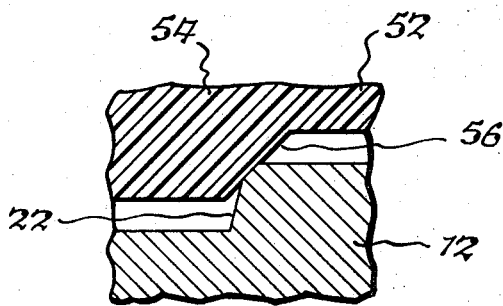

SUPPLY AND EXHAUST CONTROL VALVE

BACKGROUND OF THE INVENTION

This invention relates to control valves and is particularly concerned with a multiport control valve of the type sometimes referred to as a supply and exhaust valve. Valves of this type have long been used and many different designs for such valves have been devised. However, for certain types of use, the valves hitherto available have not been entirely satisfactory.

SUMMARY OF THE INVENTION

The valve construction of the present invention provides a control valve of the supply and exhaust type in which the pressure balance is such that a minimum actuation force is required regardless of fluid pressure. The construction also permits low preloading of the valve springs and reduces to a minimum both leakage and undesired interflow between ports during actuation while ensuring minimum pressure drop through the valve.

DESCRIPTION OF THE DRAWINGS

FIG. 3 is a longitudinal sectional view of the control valve similar to FIGS. 1 and 2 but illustrating an alternate working position of the valve; and FIG. 4 is an enlarged, fragmentary, sectional view illustrating the piston seated within the valve housing.

DESCRIPTION OF A PREFERRED EMBODIMENT

Figure 1:
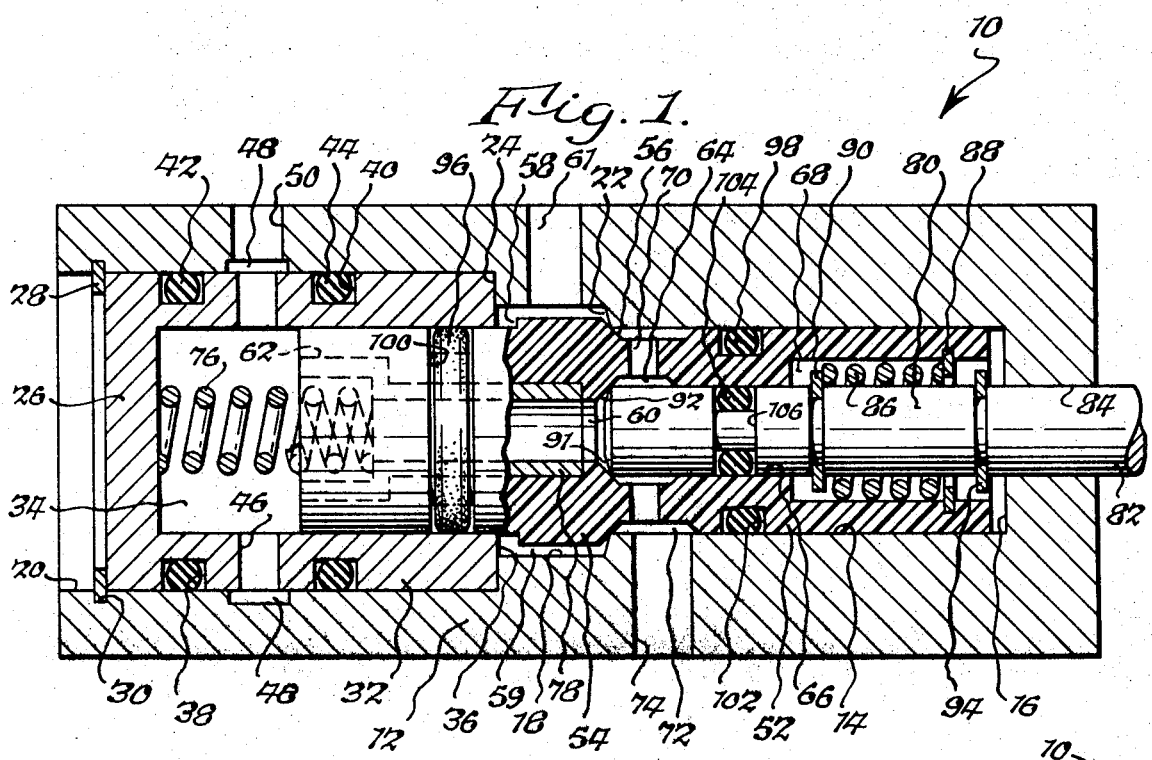
FIG. 1 is a longitudinal sectional view of a control valve constructed in accordance with this invention, illustrating the neutral or wholly closed position of the valve.

Referring to the drawings, it will be seen that a control valve comprehensively designated 10, constructed in accordance with the principles of this invention, comprises a housing 12 having a cylindrical well 14 extend longitudinally therein. The well comprises an inner portion 16, an intermediate portion 18, and an outer portion 20, the portions 18 and 20 being successively of larger diameter than the portion 16. At the juncture of well portions 16 and 18 there is formed a beveled, annular shoulder 22 and at the juncture of portions 18 and 20 a flat, annular shoulder 24 is formed.

A cup-shaped guide plug 26 is snugly fitted within outer portion 20 of the well 14 and at its open, inner end is maintained in position against the shoulder 24 by means of a retaining ring 28 seated in an annular groove 30 adjacent the outer end of outer well portion 20. The guide plug 26 has a cylindrical wall 32 which defines a chamber 34, and has an annular face at the open end thereof which projects radially inwardly of shoulder 24 to form a flat annular abutment 36. A pair of circumferential grooves 38 and 40 are provided in the outer periphery of the wall 32 to accommodate a pair of O-ring seals 42 and 44, respectively. The grooves are disposed on either side of diametrically opposed passageways or ports 46 in the wall 32, the ports providing communication between the chamber 34 and an internal annular groove 48 in the housing 12. A port 50 provided in the housing provides communication through the grooves 46 and 48 between the exhaust chamber 34 and the outside of the housing.

A valve cartridge or piston 52 is slidably mounted within the well with one end in the inner portion 16 of the well 14 and its other end in the chamber 34 of the guide plug 26. Intermediate its ends, in the intermediate portion 18 of the well 14 the piston 52 is provided with an enlarged portion or head 54. On the right side of the head 54 there is provided a beveled valve face 56 adapted to coact with the edge of the annular shoulder 22. On the left side of the head 54 there is provided a shoulder 58 adapted to engage abutment 36 of the guide plug 26. The intermediate portion 18 of the well 14 between the shoulder 22 and the abutment 36 constitutes an inlet chamber 59 in the housing 12 which communicates through a port 61 with the exterior of the housing.

The valve piston or cartridge 52 is hollow, there being therein from left to right, respectively, a bore 60 having an enlarged outer end 62, a chamber 64, and a bore 66 having an enlarged outer end 68. Each of the bores 60 and 66 opens into the chamber 64, thus providing a passage through the cartridge. The chamber 64 also communicates through ports 70 formed in the piston with an annular groove 72 formed in the exterior of the cartridge adjacent the head 54 thereof. The groove 72 communicates with the port 74 provided in the wall of housing 12 which extends to the outside of the housing. A compression spring 76 bearing at one end against the bottom of the chamber 34 and at its other end against a tubular metal ferrule 78 inserted in the bore 60 of the valve cartridge 52 is provided for biasing the cartridge 52 to the right so that the face 56 of the head seats on the shoulder 22, thereby closing communication between the groove 72 and chamber 59.

A plunger 80 is provided in the right end of the cartridge 52, being slidably mounted in the bore 66 thereof. An end 82 of the plunger extends through a hole 84 formed in the closed end of the housing 12 and is adapted to be manually or mechanically actuated from the exterior of the housing. A compression spring 86 in the enlarged outer end 68 of the bore 66 is interposed between a retaining ring 88 removably mounted in a groove in the valve cartridge 52 adjacent the right end thereof and a retaining ring 90 removable mounted in a groove formed in the plunger 80. The spring 86 biases the plunger to the left whereby the beveled seating surface 91 formed on the inner end of the plunger contacts a seat 92 formed in the left end of the chamber 64, thereby closing communication between the chamber 64 and the bore 60. Another retaining ring 94 removably mounted in a groove on the plunger 80 outwardly of the rings 88 and 90 limits motion of the plunger 80 away from the seat 92 by contacting the end of the well 14.

Sealing O-rings 96 and 98 are disposed, respectively, in grooves 100 and 102 formed in the outer face of the valve cartridge 52. The O-ring 96 seals against the wall 32 of the guide plug 26 and the O-ring 98 seals against the inner surface of the inner portion 16 of the well 14 to the right of the annular groove 72. An O-ring 104 is disposed in a groove 106 in the plunger 80 and seals against the bore 66 between the enlarged end 68 of the bore and the chamber 64. It will be apparent that the size and arrangement of the sealing O-rings, including rings 42 and 44, and their associated mounting grooves is such as to provide a pressure balance in the valve.

The operation of the control valve described above is simple and efficient. In FIG. 1 the valve is shown in closed or normal position with the beveled face 56 of the enlarged portion 54 of valve cartridge 52 serving as a valve to block flow between chamber 59 and port 72 by its seating contact with the shoulder 22, while flow between the port 74 and bore or passage 60 is blocked by contact of the beveled seating surface 91 on the valve end of the plunger 80 with the seat 92 on the valve cartridge 52. Although other methods of operation are possible, the port 61 is ordinarily connected by suitable means to a source of fluid under pressure and will hereinafter be referred to as the inlet port; port 74 is ordinarily connected by suitable means to a pressure chamber for actuation of a piston, motor, or the like (not shown) and hereinafter will be referred to as the work port; and port 50, hereinafter referred to as the exhaust port, is designed for the exit of fluid from the work either directly into the atmosphere or, by suitable means connected thereto, into a fluid reservoir (not shown). Inasmuch as the connecting means employed form no part of the present invention, they are not illustrated.

Figure 2:
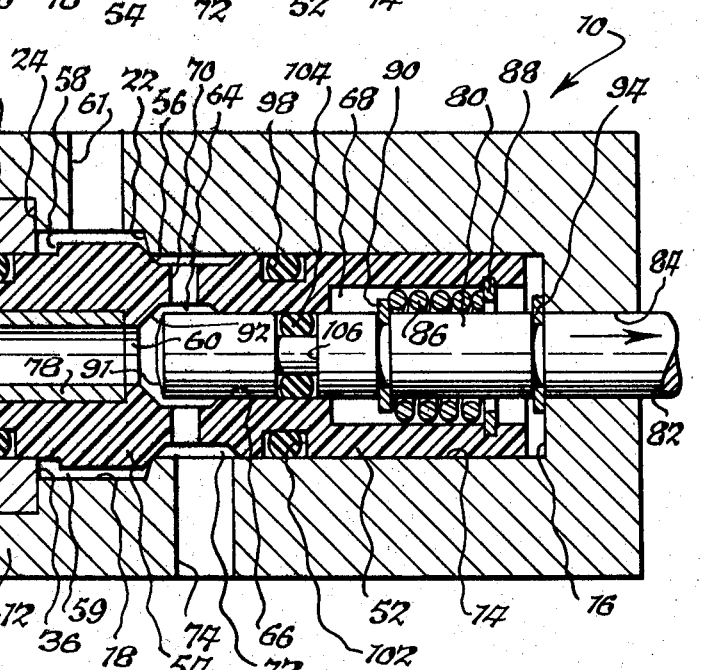
FIG. 2 is a longitudinal sectional view of the control valve similar to FIG. 1 but illustrating a first working position of the valve.

In FIG. 2, the valve elements are shown in position whereby to exhaust fluid from the work through the work port 74, the annular groove 72 in the cartridge 52, the ports 70, chamber 64, passage 60, chamber 34, ports 46, groove 48 in the housing 12, and the exhaust port 50. In this position, communication between the inlet port 61 and the work port 74 is blocked by the seating of beveled face 56 of valve cartridge 52 on the beveled shoulder 22 of the housing under the bias of the spring 76. It will be noted that plunger 80 has been moved to the right, thereby compressing the spring 86.

In FIG. 3, the plunger 80 has been moved to the left from the normal position shown in FIG. 1, thereby opening communication between the inlet port 61 and work port 74 through the chamber 59, and annular groove 72 in the cartridge 52. The plunger 80 maintains the passage 60 closed and compresses spring 76 so that upon release of the plunger the valve elements return to the position shown in FIG. 1 and pressure is maintained in the work port and apparatus connected thereto.

It will be observed that leakage of fluid between the inside of the housing and the exterior thereof is prevented by the sealing O-rings provided in the valve. The O-rings 96 and 98 on the cartridge 52 block leakage from the inlet and work ports along the length of the cartridge; the O-ring 104 prevents leakage from the chamber 64 along the plunger 80; and the O-rings 42 and 44 prevent leakage along the plug 26 to or from the port 50. As will be seen, the O-rings are so formed and disposed as to maintain a pressure balance at the inlet and work ports. Thus, in actuating the valve only the preload of one or the other of the springs 76 and 86 must be overcome. It is also to be noted that, although the springs 76 and 86 exert force in opposed directions, there is no real opposition because of the spring 86 being carried in the cartridge 52. Thus, the preloading of each spring need be only that required for sealing at the appropriate seat.

While the housing 12 and plunger 80 of the valve 10 are preferably formed of metal, other suitable materials can be employed. The valve cartridge 52 should be of strong but resilient or yieldable material whereby a fluidtight seal is readily established by the beveled face 56 on the valve cartridge 52 against the metal shoulder 22, the edge of which (as shown enlarged in FIG. 4), is preferably coined or rounded, and by the beveled valve surface 91 on the plunger 80 against the seat 92. Although a number of elastomeric materials can be used for the valve cartridge, a wear-resistant material such as polyurethane or a tetrafluoroethylene resin is preferred. The ferrule 78 is also preferably formed of metal and is effective to reinforce the piston or cartridge 52. The sealing O-rings may be formed from any suitable resilient and compressible material. Such O-rings are per se conventional.

It will be understood that a plurality of control valves according to the invention may be used together either in separate housings or in a common housing whereby to provide fluid control of more than one fluid-actuated device and that one or a plurality of control valves may be actuated by various known manual, mechanical, or electrical means controlled selectively or otherwise as desired. It will also be understood that the operation of the control valve shown and described may be suitable varied as desired for control of various devices. Therefore, the designations "inlet," "work," and "exhaust" as applied to the respective ports are not to be considered as limiting.

Valves according to the present invention are advantageous in requiring minimum travel of the actuation device, having no undesired interflow during actuation and no leakage, giving a minimum of pressure drop, and in being extremely simple to manufacture, assemble, and maintain.

The terms upper, lower, top, bottom, right, left and similar terms of position or direction as used hereinafter refer to the illustrations in FIGS. 1—3, but are used only for convenience of description. Such terms should not be construed as limiting the scope of this invention or as implying a necessary positioning of the structure or of portions thereof.

I claim:

1. A control valve comprising a housing having a well therein and having an inlet port, an exhaust port, and a work port, said ports extending between the outside of said housing and said well and being spaced longitudinally of said housing; a valve cartridge movable longitudinally within said housing and slidable engaging a portion of said well, said cartridge having a valve face adapted for contact in one position with a portion of said housing whereby to block flow between said inlet port and said work port and being spring biased toward said one position; a plunger slidably mounted in said cartridge and having a portion projecting longitudinally from said housing, said plunger being provided with a valve face adapted for contact in one position with a seat carried by said cartridge whereby to block flow between said work port and said exhaust port and being spring biased toward said one position, and said plunger being movable by said projecting portion in one direction to move said cartridge to open communication between said inlet port and said work port and movable in the opposite direction to open communication between said work port and said exhaust port; and sealing means carried by said cartridge and by said plunger.

2. A control valve as defined in claim 1 in which a guide plug is provided adjacent the open end of said well and said valve cartridge has slidable engagement with the interior of said plug.

3. A control valve as defined in claim 2 in which a chamber is provided in said guide plug and means is provided for communication between said work port and said exhaust port through said valve cartridge and said chamber.

4. A control valve as defined in claim 2 in which there is provided sealing means carried by said guide plug on each side of said exhaust port.

5. A control valve as defined in claim 1 in which there is provided sealing means carried by said valve cartridge on each side of said inlet port and said work port.

6. A control valve as defined in claim 1 in which said sealing means carried by said plunger engages against the interior of said cartridge.

7. A control valve as defined in claim 1 in which the direction of movement of said valve faces in blocking flow of fluid is in the direction of fluid flow.

8. A control valve as defined in claim 3 in which there is provided sealing means carried by said guide plug on each side of said exhaust port.

9. A control valve as defined in claim 2 in which there is provided sealing means carried by said valve cartridge on each side of said inlet port and said work port.

10. A control valve as defined in claim 2 in which said sealing means carried by said plunger engages against the interior of said cartridge.